(12) United States Patent
Huber et al.

(10) Patent No.: US 12,018,122 B2
(45) Date of Patent: Jun. 25, 2024

(54) METHOD FOR PRODUCING SILANE-MODIFIED POLYMERS

(71) Applicant: MERZ+BENTELI AG, Niederwangen (CH)

(72) Inventors: Stefan Huber, Langenthal (CH); Thomas Zuber, Niederhünigen (CH); Fritz Burkhardt, Oberburg (CH); Claude Lerf, Meyriez (CH)

(73) Assignee: MERZ+BENTELI AG, Niederwangen (CH)

( * ) Notice: Subject to any disclaimer, the term of this patent is extended or adjusted under 35 U.S.C. 154(b) by 636 days.

(21) Appl. No.: 17/292,139

(22) PCT Filed: Nov. 6, 2019

(86) PCT No.: PCT/EP2019/080326
§ 371 (c)(1),
(2) Date: May 7, 2021

(87) PCT Pub. No.: WO2020/094685
PCT Pub. Date: May 14, 2020

(65) Prior Publication Data
US 2021/0395450 A1 Dec. 23, 2021

(30) Foreign Application Priority Data
Nov. 7, 2018 (EP) .................... 18204858

(51) Int. Cl.
*C08G 65/336* (2006.01)
*C08G 63/91* (2006.01)

(52) U.S. Cl.
CPC ......... *C08G 65/336* (2013.01); *C08G 63/916* (2013.01)

(58) Field of Classification Search
USPC .......................................................... 528/25
See application file for complete search history.

(56) References Cited

U.S. PATENT DOCUMENTS

2006/0247407 A1 11/2006 Bachon et al.

FOREIGN PATENT DOCUMENTS

| EP | 1 371 670 A1 | 12/2003 |
| EP | 1 944 329 A1 | 7/2008 |
| EP | 2 308 914 A1 | 4/2011 |
| EP | 2 341 116 A1 | 7/2011 |
| WO | 03/018658 A1 | 3/2003 |
| WO | 2008/031895 A1 | 3/2008 |
| WO | 2018/042030 A1 | 3/2018 |

OTHER PUBLICATIONS

Feb. 6, 2020 International Search Report issued in International Patent Application No. PCT/EP2019/080326.

*Primary Examiner* — Terressa Boykin
(74) *Attorney, Agent, or Firm* — Oliff PLC

(57) ABSTRACT

A method for producing an alkoxysilane polymer via a carbamate, thiocarbonate or carbonate-terminated prepolymer (IIIa) or (IIIb) includes reaction of a polymer backbone of formula (I) terminated with at least two amino, mercapto or hydroxyl groups and with a chloroformate of formula (IIa) or a pyrocarbonate of formula (IIb) (I) (IIa) (IIb) (IIIa) (IIIb), wherein $R^1$ and $R^3$ represent a linear or branched, saturated or unsaturated alkyl or alkenyl group with 1 to 10 carbon atoms or a mono- or polycyclic aliphatic or aromatic ring system with 5 to 18 carbon atoms in the ring system, which is optionally substituted by one or more groups $R^2$, X is oxygen or sulphur, n is 0 for a linear or branched, saturated or unsaturated alkyl or alkenyl group and is 0.1 or 2 for a mono- or polycyclic aliphatic or aromatic ring system, and A represents a polymer backbone.

13 Claims, No Drawings

METHOD FOR PRODUCING SILANE-MODIFIED POLYMERS

The invention relates to a method for producing an alkoxysilane polymer via a carbamate-, thiocarbonate- or carbonate-terminated prepolymer, which can be produced in high yield.

Silane-modified polymers (SMP) have been known to those skilled in the art for some time. Said compounds are generally moisture-reactive polymers and are used in particular in moisture-curing sealants or adhesives.

All silane-modified polymers have in common that, in addition to an organic polymer backbone, they have at least one hydrolyzable silyl group which is bonded to the polymer chain via corresponding coupling groups.

With the current methods for producing silane-modified polymers, only a relatively limited number of commercial products are available. Depending on the type of production, the choice of possible polymer chains is more or less restricted.

In addition to copolymerization, graft copolymerization and polyaddition reactions leading to randomly silylated polymers, the polymers are also described by the reaction of an isocyanate group with an isocyanate-reactive group. WO 03/018658 describes a method in which a silane having an OH, SH or $NHR^3$-Group is reacted with an isocyanate-terminated prepolymer.

EP-A-1371670 describes a method in which a vinyl polymer having at least one hydroxyl group is reacted with a compound which, in addition to a silyl group, has a group which can react with the hydroxyl group. An isocyanate group is also specifically mentioned in this regard.

EP-A-2341116 describes a polymeric compound comprising a polymer chain and at least one silyl group bonded to the polymer chain, the polymer chain and the silyl group being linked to each other by a β-hydroxyamine group. The amine- or epoxy-terminated prepolymers used as reactant for the synthesis of these polymers are only available on a large scale to a limited extent and are relatively expensive. On an industrial scale, the reactants are used as additives in polymer compositions, but not as prepolymers for a discrete polymer, which greatly impairs their availability.

US 2006/0247407 describes a method for producing compounds having at least one urea group and at least one silyl group, in which a compound having at least one amino group and a carbamate are reacted as reaction partners, at least one of the reaction partners bearing a silyl group.

WO 2018/042030 describes the use of an organocarbonate-modified prepolymer as a reactant for producing isocyanate-free and isothiocyanate-free alkoxysilane polymers. Disadvantages of this method are the low yields of alkyl- and aryl-terminated prepolymers.

The object of the present invention is accordingly to provide a method for producing an alkoxysilane polymer in which the prepolymer used for this purpose can be produced in high yield.

The object is achieved by the method according to claim 1. Further preferred embodiments are the subject matter of the dependent claims.

It has been found, surprisingly, that the yields of the alkoxysilane polymer can be increased significantly using the method according to the invention. The method according to the invention for producing an alkoxysilane polymer includes the production of a carbamate-, thiocarbonate- or carbonate-terminated prepolymer (IIIa) or (IIIb), which can be produced in high yield. The alkoxysilane polymer obtained by the method according to the invention has essentially the same viscosity as the amino, mercapto or hydroxyl group-terminated polymer used for the production. A possible explanation for this could be that the method according to the invention is preferably carried out at room temperature. As a result, partial pre-crosslinking can largely be avoided, which means that the alkoxysilane polymer obtained has essentially the same viscosity as the amino, mercapto or hydroxyl group-terminated polymer used for production. The viscosity can for example be measured with a Haake Rheostress RS6000, which has a 40 mm cone/plate measuring system.

This is obtained by reacting a polymer backbone of the formula (I), terminated with at least two amino, mercapto or hydroxyl groups, and a chloroformate of formula (IIa) or a pyrocarbonate of formula (IIb):

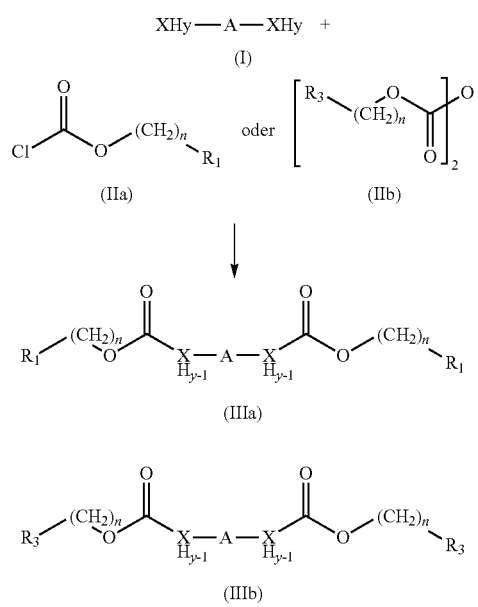

$R_1$ and $R_3$ are a linear or branched, saturated or unsaturated alkyl or alkenyl group having 1 to 10 carbon atoms or a mono- or polycyclic aliphatic or aromatic ring system having 5 to 18 carbon atoms in the ring system, which is optionally substituted by one or more radicals $R^2$, wherein $R^2$ is selected from the group consisting of a linear or branched, saturated or unsaturated alkyl or alkenyl group having 1 to 10 carbon atoms, a nitro group, a carboxylic ester group, a carboxylic acid group, a sulfone group and a halogen group, wherein the halogen group is preferably selected from the group consisting of Cl, F, I and Br, X is oxygen, nitrogen or sulfur, y is 1 when X is oxygen or sulfur and 1 or 2 when X is nitrogen, n is 0 in the case of a linear or branched, saturated or unsaturated alkyl or alkenyl group and is 0, 1 or 2 in the case of a mono- or polycyclic aliphatic or aromatic ring system and A is a polymer backbone.

With the method according to the invention, the prepolymer (III) is obtained in high yields of over 75%. In addition, the reaction can be carried out at room temperature, which is an ecological and economic advantage. Furthermore, there are no by-products that could impair stability.

In one embodiment, the carbamate-, thiocarbonate- or carbonate-terminated prepolymer is obtained by reacting a polymer backbone of formula (I), terminated with at least two amino, mercapto or hydroxyl groups, and a chloroformate of formula (IIa). The prepolymer according to the invention thus obtained can be produced inexpensively and at high yield.

In another embodiment, the carbamate-, thiocarbonate- or carbonate-terminated prepolymer is obtained by reacting a polymer backbone of formula (I), terminated with at least two amino, mercapto or hydroxyl groups, and a pyrocarbonate of formula (IIb).

The first reaction step of the method according to the invention is preferably carried out in the absence of a first catalyst I. A first catalyst I is understood to mean a catalyst for the first reaction step. This is a compound that only catalyzes the reaction, but does not act as acid scavenger. Amines which serve as acid scavengers do not fall under the term of first catalyst I, since they primarily serve as acid scavengers. Possible amines which are not first catalysts (I) in the context of the present invention are, for example, TEA (triethylamine), other amines or cycloaromatic amines.

It has been found, in fact, that many catalysts that are typically used in the production of carbamate-, thiocarbonate- or carbonate-terminated prepolymers have a negative effect on the subsequent conversion to alkoxysilane polymers and, for example, result in degradation of the polymer chains, especially in the case of polymers with ester compounds. Due to the absence of the first catalyst (I) in the first reaction step, in the subsequent reaction step, the reaction with an alkoxysilane, partial crosslinking of the alkoxysilane polymers can be substantially prevented.

Both reaction steps are preferably carried out in the absence of a catalyst. In the case of carbonate-terminated polymers, both reaction steps are preferably carried out in the absence of a catalyst. In the case of carbamate-terminated polymers, the use of a catalyst for the second reaction step can be helpful due to the long reaction time of several days in its absence.

In one embodiment, $R^1$ in the chloroformate of formula (IIa) is a mono- or polycyclic aliphatic ring system having 5 to 18 carbon atoms in the ring system, which may be substituted by one or more radicals $R^2$, where n is preferably 0 or 1 and most preferably 0. $R^2$ is preferably selected from the group consisting of a linear or branched, saturated or unsaturated alkyl or alkenyl group having 1 to 10 carbon atoms, a nitro group, a carboxylic ester group, a carboxylic acid group, a sulfone group and a halogen group, the halogen group preferably being selected from the group consisting of Cl, F, I and Br. Possible mono- or polycyclic aliphatic ring systems are, for example, cyclopentyl, cyclohexyl or cycloheptyl.

In the chloroformate of formula (IIa), $R^1$ is preferably a mono- or polycyclic aromatic ring system having 6 to 18 carbon atoms in the ring system, since precisely these prepolymers can be produced at very high yield. The ring system is preferably unsubstituted, since unsubstituted ring systems are less expensive. Substituted ring systems, however, each have a higher reactivity. $R^1$ is particularly preferably a ring system selected from the group consisting of phenyl, 4-nitrophenyl, 4-methoxyphenyl, 4-methoxycarbonylphenyl, 1-naphthyl, 4-nitro-1-naphthyl, 4-methoxy-1-naphthyl, 4-methoxycarbonyl-1-naphthyl, 2-naphthyl, 1-anthryl, 2-anthryl, 9-anthryl, 1-phenanthryl and 9-phenanthryl and n is 0 or 1. $R^1$ is particularly preferably phenyl, 4-nitrophenyl or 4-methoxyphenyl and n is 0 or 1, i.e. the chloroformate of formula (IIa) is particularly preferably selected from the group consisting of phenyl chloroformate, 4-nitrophenyl chloroformate, 4-methoxyphenyl chloroformate, benzyl chloroformate, 4-nitrobenzyl chlorophormate and 4-methoxybenzyl chloroformate.

$R^1$ may alternatively also be an alkyl group selected from the group consisting of methyl, ethyl, propyl, isopropyl, n-butyl, isobutyl, tert-butyl, n-pentyl, isopentyl, n-hexyl, n-heptyl, n-octyl, n-nonyl and n-decyl. $R^1$ is particularly preferably isobutyl.

The chloroformates are particularly preferably benzyloxycarbonyl chloride, since this commercially available reactant results in prepolymers of general formula (III) in high yield, which can be further reacted to give the alkoxysilane polymers.

In one embodiment of the method according to the invention, the polymer backbone of formula (I) has exactly two amino, mercapto or hydroxyl groups. Such prepolymers result in alkoxysilane polymers having a low degree of crosslinking, which are particularly preferably used for applications which have high elasticity and a low modulus, such as, for example, elastic sealants.

In another embodiment of the method according to the invention, the polymer backbone of formula (I) has more than two amino, mercapto or hydroxyl groups. Such prepolymers result in alkoxysilane polymers having a high degree of crosslinking, which are particularly preferably used for applications which have a high modulus, high tensile strength or high hardness, such as, for example, adhesives or coatings.

For example, an amino, mercapto or hydroxyl group may be present in the side chain of the monomer unit of the polymer backbone. In one embodiment, essentially each monomer unit has a side chain having an amino, mercapto or hydroxyl group which can react with a chloroformate of formula (IIa).

The polymer backbone A is preferably selected from the group consisting of polyethers, polyalcohols, polyolefins, polyesters, polycarbonates, polyacrylates, polysulfides, polysiloxanes, polyamines, polyamides, polyacetals and copolymers thereof. Most preferred is polypropylene glycol, and polyesters such as poly(3-methyl-1,5-pentanediol adipate).

The prepolymer of formula (III), which can be produced using the method according to the invention, is preferably selected from the group consisting of:

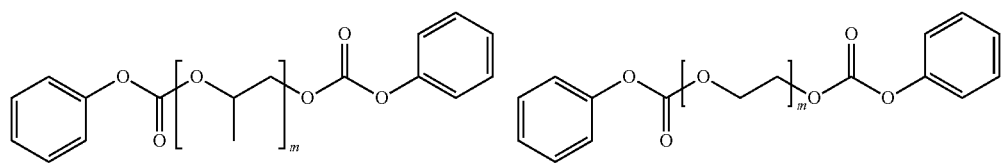

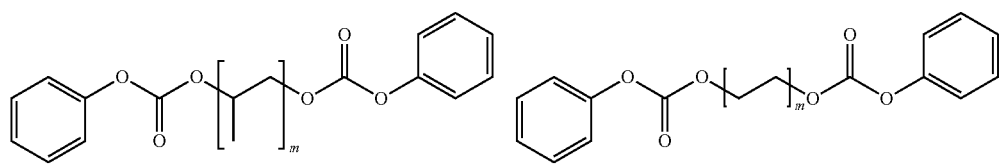
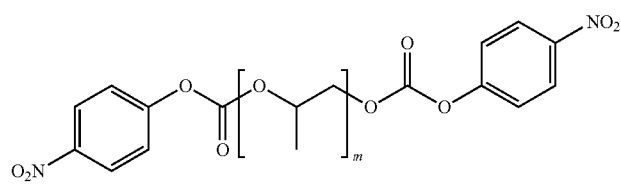
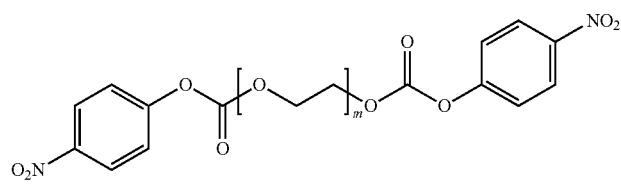
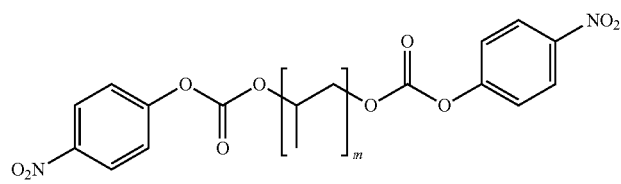
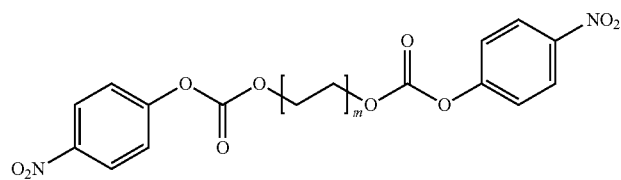
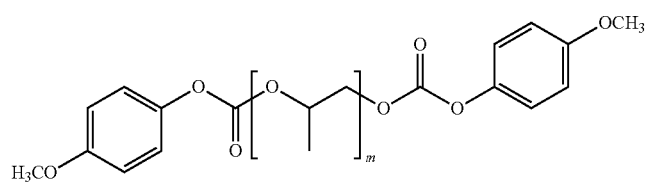
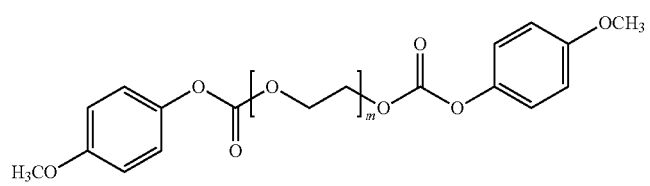
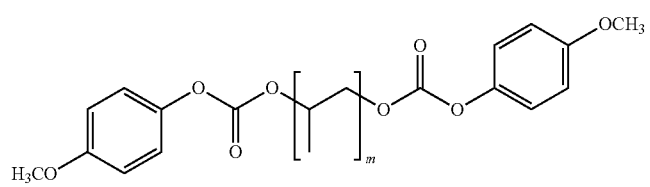
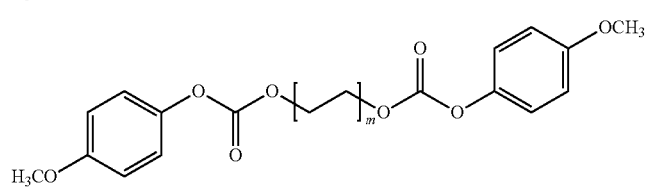

-continued
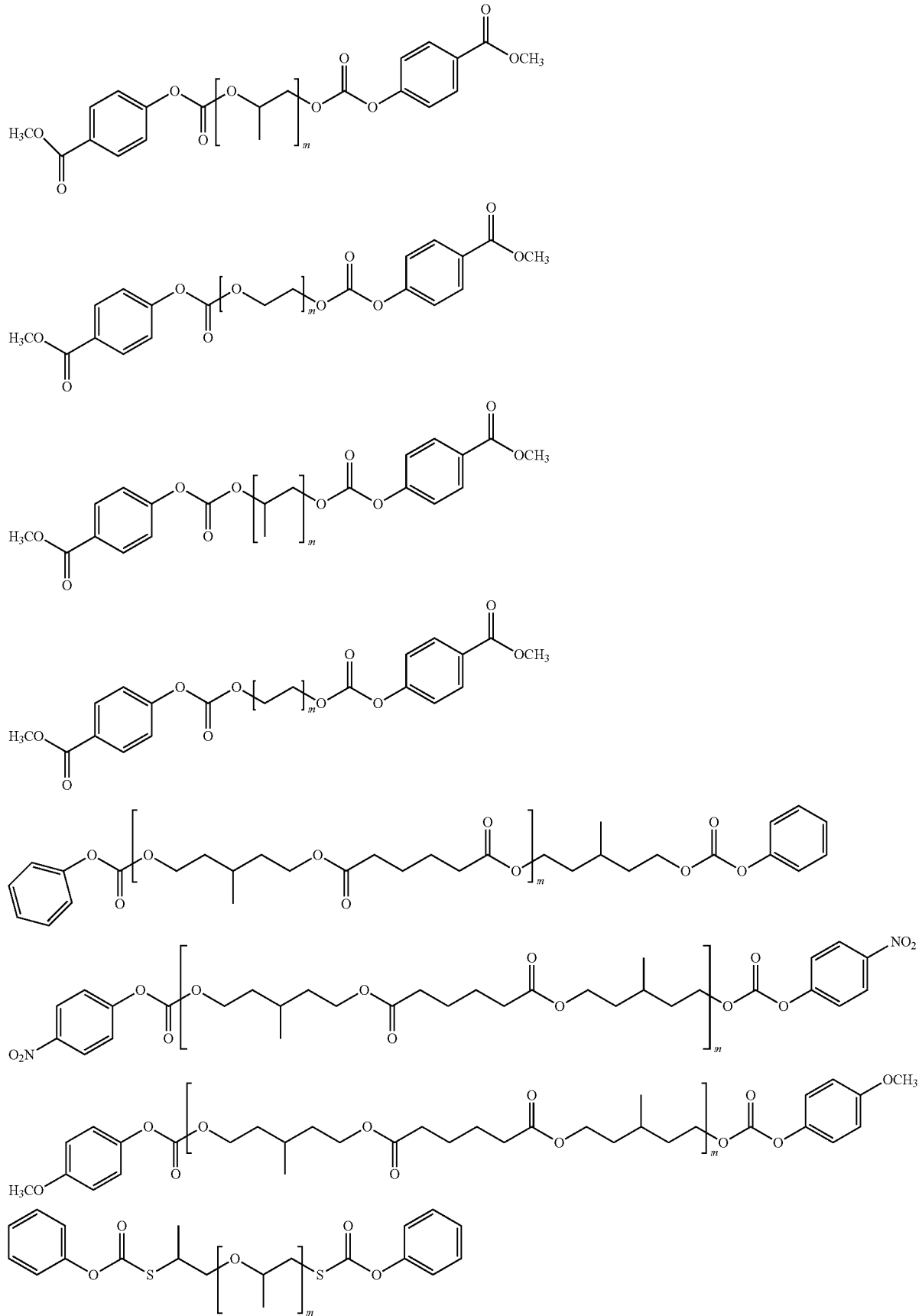

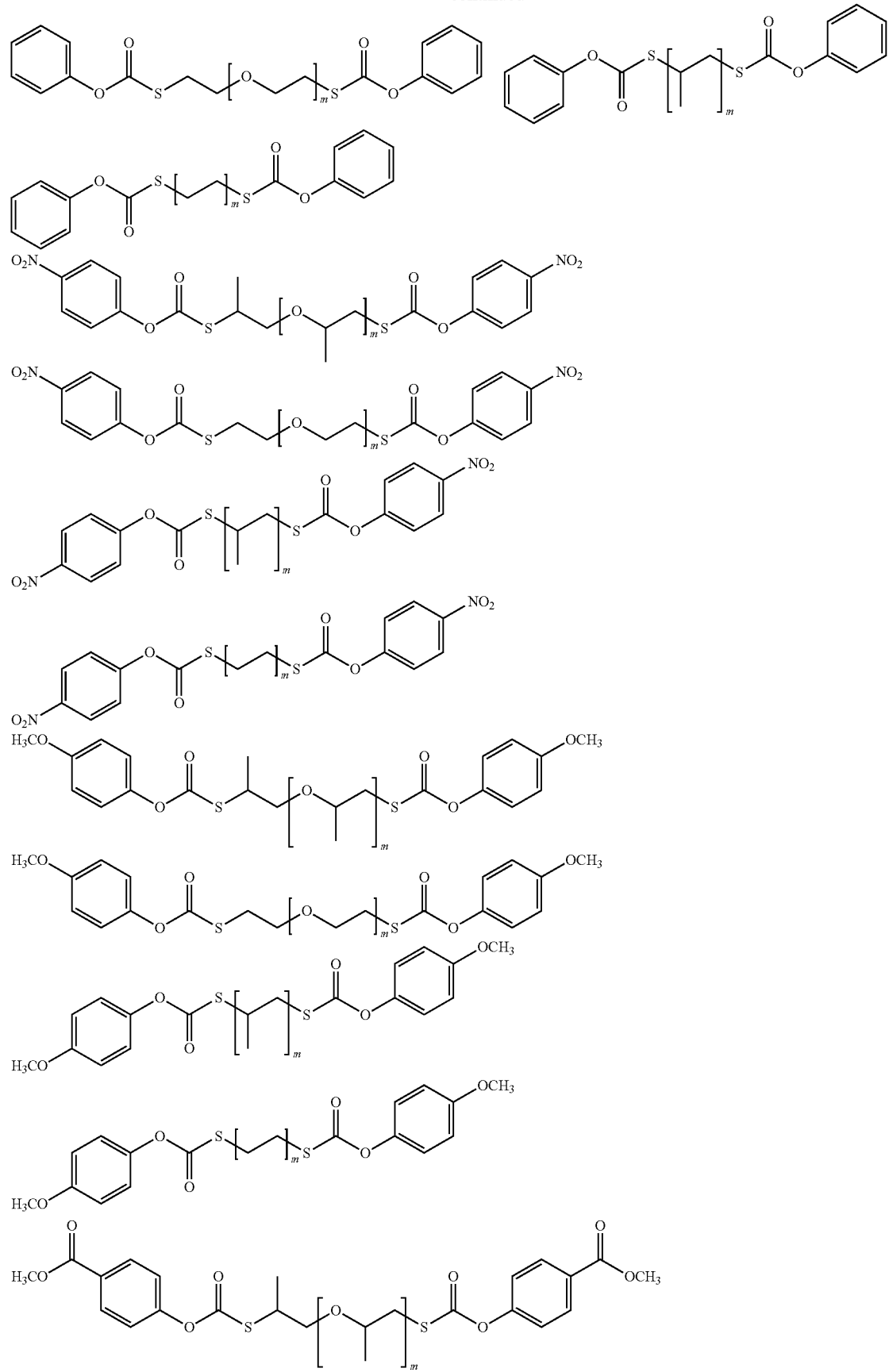

-continued
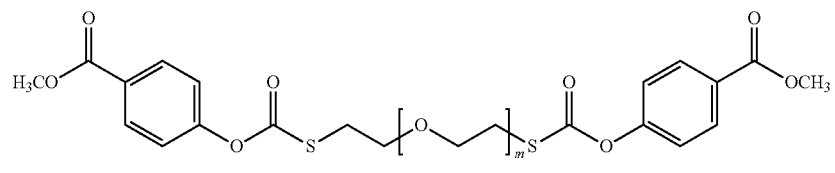
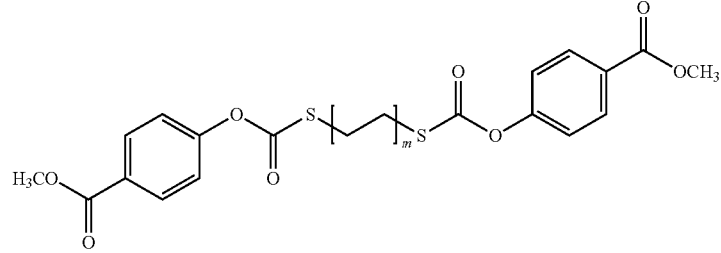
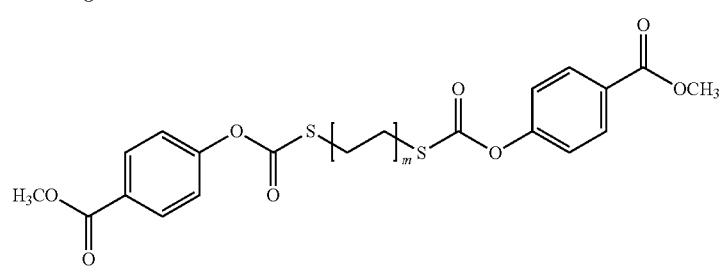
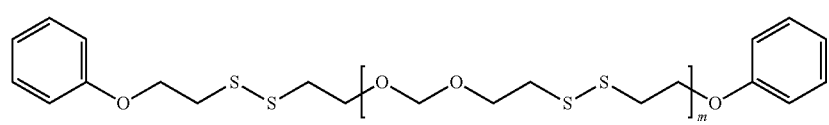
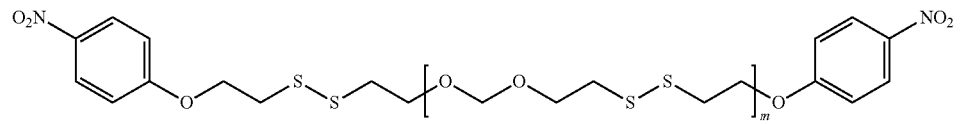
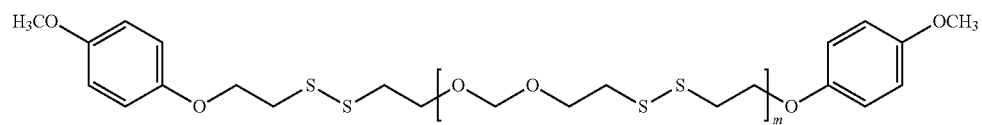
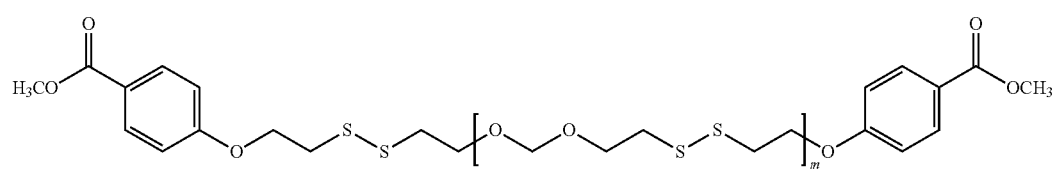
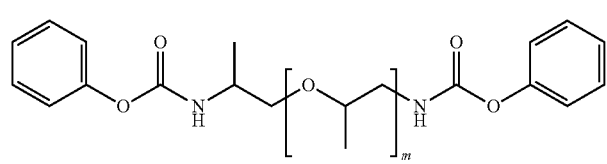
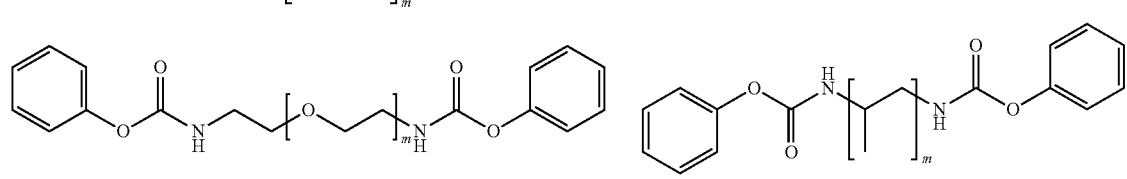
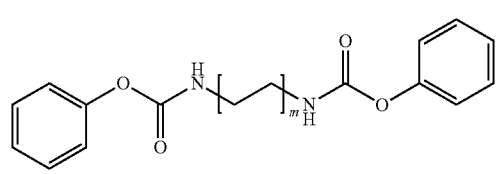

-continued
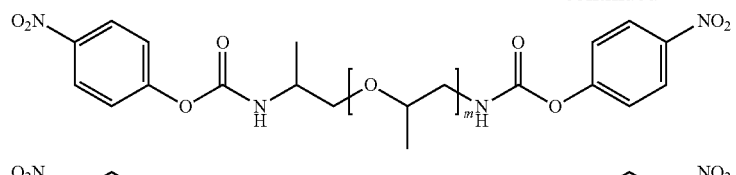
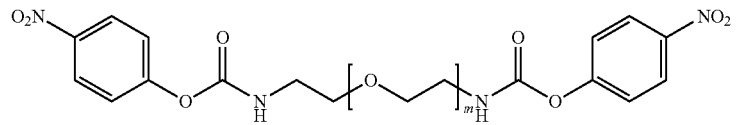
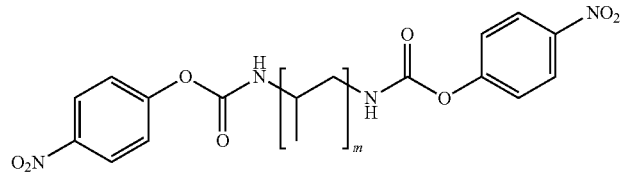
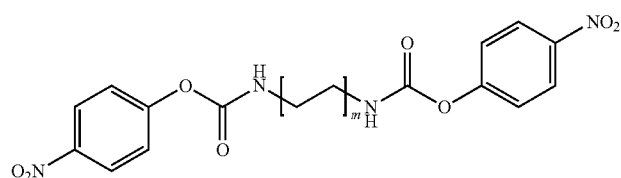
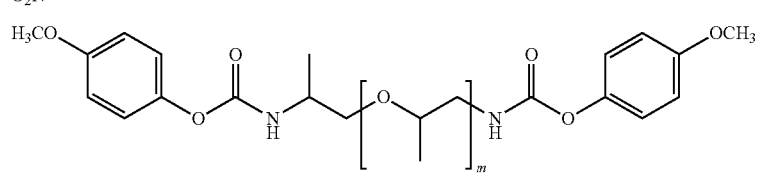
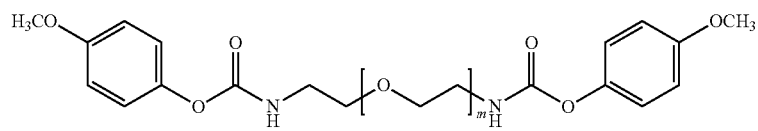
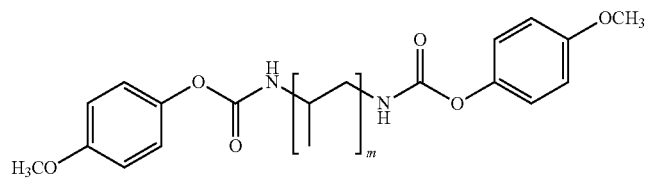
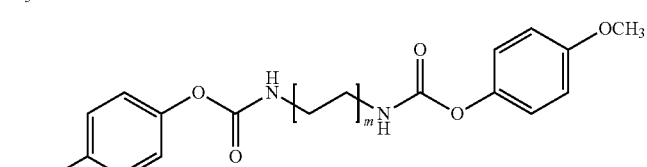
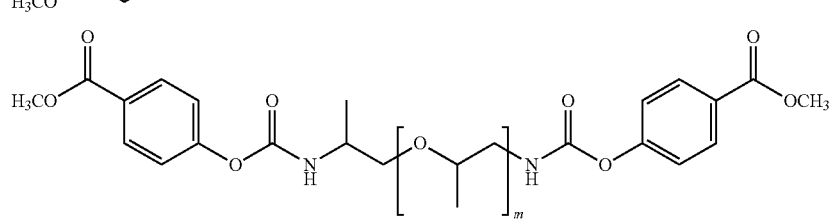
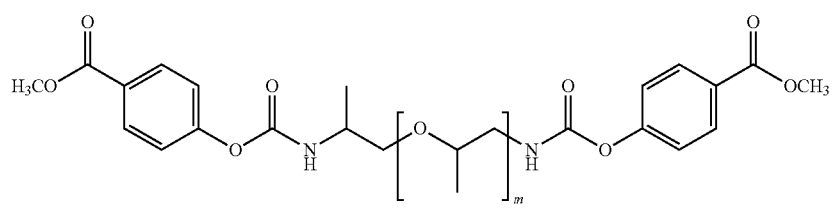

-continued

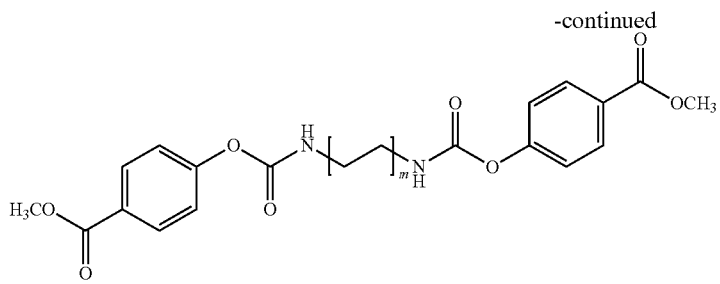

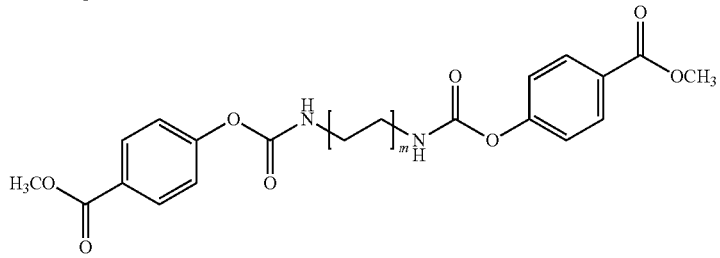

where m is the number of monomer units and the molecular weight is between 1000 and 100 000 g/mol, preferably between 2000 and 50 000 g/mol and thus defines the number m of monomer units.

In a further embodiment, the chloroformates of formula (IIa) can first be converted to a pyrocarbonate of formula (IIb) and then these can be further reacted with the polymer bearing amino, mercapto or hydroxyl groups. Such a method is particularly recommended for the alkyl chloroformates, which are very sensitive.

In order to obtain the silane-modified polymer, the prepolymer produced by the method according to the invention, in a further step, is either
(A) reacted with an aminoalkoxysilane or a mercaptoalkoxysilane, optionally in the presence of a catalyst (II) for the second reaction step or
(B) reacted with a diamine, a triamine, a dithiol or a trithiol to form a modified prepolymer and then reacted with an alkoxysilane compound having an epoxy group, wherein an alkoxysilane polymer is formed.

In the reaction step of variant (A), the prepolymer obtained by the method according to the invention is accordingly further reacted, in one embodiment, with an aminoalkoxysilane to form a carbamate (urethane). The reaction is preferably carried out at −20 to 150° C., particularly preferably at 20 to 100° C. and especially preferably at 20 to 60° C.

The aminoalkoxysilane is preferably a compound selected from the group comprising 3-aminopropyltrimethoxysilane, 3-aminopropyltriethoxysilane, N-(n-butyl)-3-aminopropyltrimethoxysilane, N-(n-butyl)-3-aminopropylmethyldimethoxysilane, N-(n-butyl)-3-aminopropyltriethoxysilane, N-ethylaminoisobutyltrimethoxysilane, N-ethylaminoisobutylmethyldimethoxy silane, 3-piperazinopropyltrimethoxysilane, 3-piperazino propylmethyldimethoxysilane, 3-piperazinopropyltriethoxysilane, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, N-cyclohexyl-3-aminopropyltriethoxysilane and N-cyclohexyl-3-aminopropyltrimethoxysilane. Also suitable are alpha-silanes such as N-cyclohexylaminomethyltriethoxysilane and N-(6-aminohexyl) aminomethoxytriethoxysilane or ureidosilanes such as 3-ureidopropyltrimethoxysilane. Likewise, an equimolar reaction product of a diamine with an epoxysilane, such as, for example, the equimolar reaction product of piperazine and 3-glycidoxypropyltrimethoxysilane, is a suitable alkoxysilane. Particular preference is given to alkoxysilanes having a primary amino group or a cyclic amino group since these are particularly reactive.

A catalyst can be used for this reaction. The catalyst can be heterogeneous or homogeneous catalysts, such as MCM-41 (Mobil Composition of Matter No. 41; a mesoporous material having a hierarchical pore structure from a family of silicate and aluminosilicate solids), organically modified MCM-41, Mg/La metal oxides, nanocrystalline MgO, LiOH, Li2CO3, K2CO3, Cs2CO3, Mgs(OH)2(CO3)4, zirconium(IV) butoxide, zirconium(IV) propoxide, zirconium (IV) tert-butoxide, zirconium(IV) isopropoxide, titanium tetraalkoxides, dibutyltin dilaurate, dibutyltin oxide, bistributyltin oxide, yttrium(III) acetylacetonate, zirconium (III) acetylacetonate, ytterbium(III) acetylacetonate, 1,8-diazabicyclo[5.4.0] undec-7-ene(DBU), 1,5-diazobicyclo [4.3.0]ηoη-5-ene (DBN), triflates such as, for example, bismuth(III) triflate, lanthanum(III) triflate, ytterbium(III) triflate, yttrium(III) triflate, zirconyl triflate, 1,5, 7-triazabicyclo[4.4.0]dec-5-ene (TBD), pyridine, 4-(dimethylamino) pyridine, 1,4-diaz abicyclo[2.2.2]octane, a trimethylsilylamide such as lithium bis(trimethylsilyl)amide, ZrCl2, SnCl₂ or N-heterocyclic carbenes such as, for example, 1,3-bis(2,4, 6-trimethylphenyl)imidazol-2-ylidene. Further possible catalysts for the transesterification are described in the European patent application EP 2 308 914, in particular in paragraphs 40 to 42, and are hereby incorporated by reference into the text of the application.

However, it is also possible to omit the catalyst.

The alkoxysilane polymer thus obtained can therefore be obtained at high yield.

In the reaction step of variant (A), in another embodiment, the prepolymer according to the invention is further reacted with a mercaptoalkoxysilane to form a thiocarbonate. The reaction is preferably carried out at −20 to 150° C., particularly preferably at 20 to 100° C. and especially preferably at 20 to 60° C.

The thiol is preferably a mercaptoalkoxysilane selected from the group comprising 3-mercaptopropyltrimethoxysilane, 3-mercaptopropyltriethoxysilane, 3-mercaptopropylmethyldimethoxysilane and 3-mercaptopropyltrimethoxysilane.

In the reaction step of variant (B), the prepolymer according to the invention is reacted with a suitable diamine, triamine, dithiol or trithiol, optionally in the presence of a catalyst (II). Possible diamines in this case are, for example, hexamethyldiamine, octamethylenediamine, methylpentanediamine, meta-xylylenediamine, trimethylenehexamethylenediamine, piperazine, aminoethylpiperazine or isophoronediamine.

Possible triamines are, for example, pentane-1,2,5-triamine, 1,2,3-propanetriamine, phenyl-1,2,4-triamine, phenyl-1,3,5-triamine, pyrimidine-2,4,6-triamine.

Possible mercapto compounds for this reaction are described in detail in EP 1 944 329, in particular in paragraphs 68 to 71, the content of which is hereby incorporated by reference into the description. Examples are dithiothreitol, 1,2-ethanedithiol, 1,2-propanedithiol, 1,3-propanedithiol, 1,4-butanedithiol, 1,5-pentanedithiol, 1,6-hexanedithiol, 1,7-heptanedithiol, 1,8-octanedithiol, 1,9-nonanedithiol, 1,10-decanedithiol, 1,12-dodecanedithiol, 2,2-dimethyl-1,3-propanedithiol, 3-methyl-1,5-pentanedithiol, 2-methyl-1,8-octanedithiol, 1,1,1-tris(mercaptomethyl)ethane, 2-ethyl-2-mercaptomethyl-1,3-propanedithiol, tetrakis(mercaptomethyl)methane, 1,4-cyclohexanedithiol, 1,4-bis(mercaptomethyl)cyclohexane, bis(2-mercaptoethyl) ether, bis(2-mercaptoethyl) sulfide, bis(2-mercaptoethyl) disulfide, 2,5-bis(mercaptomethyl)-1,4-dioxane, 2,5-bis(mercaptomethyl)-1-dithiane, 3,3'-thiobis(propane-1,2-dithiol), 2,2'-thiobis (propane-1,3-dithiol); and substituted or unsubstituted compounds containing aromatic mercapto groups such as thiophenol, 1,2-benzenedithiol, 1,3-benzenedithiol, 1,4-benzenedithiol, 1,3,5-benzenetrithiol, toluene-3,4-dithiol, mercaptomethylbenzene, 1,2-bis(mercaptomethyl)benzene, 1,3-bis(mercaptomethyl)benzene, 1,4-bis(mercaptomethyl)benzene and 1,3,5-tris(mercaptomethyl)benzene.

The modified prepolymer formed in this way is then reacted in a second step with an alkoxysilane compound comprising an epoxy group to form the alkoxysilane polymer. This reaction between a terminal amine of a polymer and an alkoxysilane compound having an epoxy group is described in European patent application EP 2 341 116, in particular in paragraphs [0024] to [0042]. The content of which is hereby incorporated by reference into the description.

If the alkoxysilane polymer is obtained by reacting a modified prepolymer with at least one alkoxysilane compound having an epoxy group, the preferred number of silyl groups per polymer in the case of primary amino groups is generally between 1 and twice the number of amino groups and in the case of secondary amino groups between 1 and the single number of amino groups. The same applies to prepolymers that have been modified with dithiols. The reactivity between the prepolymer having the at least two amino or mercapto groups and the compound having the epoxy group is relatively high. The reaction can optionally be accelerated by the presence of a catalyst (II). Possible catalysts are triflates such as bismuth(III) triflate, lanthanum (III) triflate, ytterbium(III) triflate, yttrium(III) triflate, zirconyl triflate, tertiary amines such as triethylamine, benzyldimethylamine, triethanolamine, phenol derivatives such as tris(dimethylaminomethyl)phenol.

Further alkoxysilane compounds having an epoxy group which are conceivable for the purposes of the present invention are listed in WO 2008/031895 (page 7, No. 41 to 47), the content of which is hereby incorporated by reference. [2-(3,4-epoxycyclohexyl)ethyl]trimethoxysilane should also be mentioned in this regard.

Alternatively, it is also possible to transesterify the prepolymer obtained by the method according to the invention, prior to the reaction steps according to variant (A) or variant (B), with an alcohol or an activated alcohol (variant (C)). The activated alcohol is preferably glycerol carbonate. The reaction leads to a modified prepolymer, the linear carbonate groups of which are additionally bonded to cyclic carbonate groups. The cyclic carbonate groups have a significantly higher reactivity. An aminoalkoxysilane or a mercaptoalkoxysilane can then be bonded to the modified prepolymer via a hydroxyurethane or a hydroxythiourethane bond.

The average number of silyl groups per alkoxysilane polymer is preferably in a range from 1 to 10 and depends on the number of carbonate groups in the prepolymer. In the case of a linear polymer backbone, the number is usually around 2; in the case of a branched polymer backbone, it is usually higher.

The alkoxysilane polymers obtained according to the reaction methods described above (variant (A), variant (B) or variant (C)) are preferably present in a composition which is used as a moisture-curing sealant or adhesive. Such a composition is essentially anhydrous. A moisture-curing sealant or adhesive hardens to a sealant or adhesive after contact with atmospheric moisture. The alkoxysilane polymers obtainable according to the invention are storage-stable under exclusion of atmospheric moisture.

In particular, when the compound is used in a sealant or adhesive composition, firstly the properties of the pasty composition, such as the toxicity profile, viscosity, rheology, processability, stability, etc., can be influenced by the choice of the polymer backbone. Secondly, the properties of the cured composition can be influenced by the choice of the polymer backbone. For instance, particularly with regard to resistance, e.g. heat resistance, fire resistance, low temperature flexibility, low temperature processability, UV stability, weather stability, chemical resistance, faecal resistance, oil and fuel resistance, water resistance and abrasion resistance, the desired properties can also be set with regard to the mechanical properties, for example tensile strength, hardness, elasticity and tackiness. The same applies to permeability, i.e. water, vapor and gas permeability, and to the toxicity profile, e.g. food compatibility, drinking water compatibility and biodegradability; the cured sealant or adhesive composition can be adjusted as required.

Particularly when using the compound according to the invention in an adhesive composition, the adhesion properties, for example plastic adhesion, wet adhesion, adhesion to porous and alkaline or acidic surfaces and adhesion to wet substrates, can be adjusted by selecting the appropriate polymer backbone suitable for the respective application. In addition, the polymer backbone largely determines the physical properties of the cured composition, such as the refractive index and the electrical, thermal and acoustic conductivity or insulation. Compounds are also preferred in which the polymer backbone is at least partially or completely polysulfide, which is preferably terminally functionalized with hydroxyl groups. Such final polymers result in sealants and adhesives with good wet adhesion, which also have high chemical, thermal and photolytic stability. Because of the variability of the possible properties to be set, the alkoxysilane polymers of the present invention are particularly suitable for use in areas of application in which such "customization" of properties is desired. For example, use in the construction, machine, electrical, vehicle or aviation industries is preferred, in which, for example, the water resistance and gas permeability for surface sealing, the mechanical properties and adhesive properties of structural bonds and the fire protection properties of the corresponding composition, etc., can be set.

The chemical resistance obtained thanks to the structure of the prepolymer, in particular the oil and fuel resistance of the alkoxysilane polymers, also enables use in the automotive industry.

It is also conceivable to use it in shipbuilding because of the weather resistance available, or in electronic applications because of the insulation properties available. For the last-mentioned applications it is also possible according to the invention to choose a silicone-free system, with which the disadvantages observed with conventional silicone compositions with regard to exudation can be circumvented. The alkoxysilane polymer can also be used in coatings such as anti-scratch coatings, adhesive or non-stick coatings, anti-graffiti coatings, as structural seals for horizontal or vertical surfaces, which can also be compatible with copper or bitumen, or coatings for textiles. The alkoxysilane polymer can generally be used in 1-component or 2-component systems. Use as shape-memory polymers, which can be used, for example, in medical technology, robotics or the automotive industry, is also conceivable.

EXAMPLES

The invention is further illustrated by the following examples.

Example 1: Carbonate-Terminated Polyether with Aminosilane 95.7 g (0.024 mol) of polyether diol (Desmophen 4028BD from Covestro) are dissolved in 100 ml of toluene at room temperature (25° C.). Then 6.1 g (0.06 mol) of triethylamine are added. The solution is homogeneous after a brief time and is colorless and clear. 7.74 g (0.049 mol) of phenyl chloroformate, pre-dissolved in 12 ml of toluene, are uniformly added dropwise to the reaction solution over a period of 45-75 minutes. The reaction mixture is further stirred for at least 8 hours. The reaction mixture is then cooled down to ca. 8° C. The resulting precipitate of triethylamine hydrochloride is filtered off and washed off with a little toluene. The solvent is then removed under reduced pressure. A carbonate-terminated polyether is obtained as product in high yield.

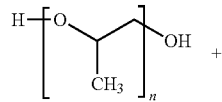

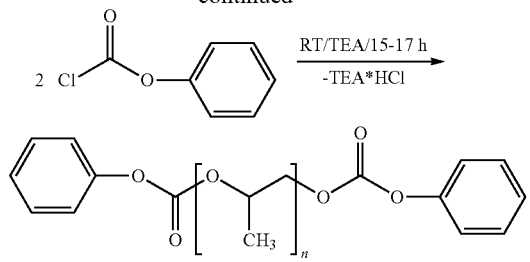

50 g (0.012 mol) of the phenyl carbonate-terminated polymer are left to react with 4.30 g (0.024 mol) of 3-aminopropyltrimethoxysilane (Evonik) for at least 12 h at 25° C. The phenol formed remains behind in dissolved form in the colorless to slightly yellowish, clear reaction mixture. Trimethoxysilane-terminated polyether is obtained as product. The trimethoxysilane groups are attached to the polyether via a urethane bond.

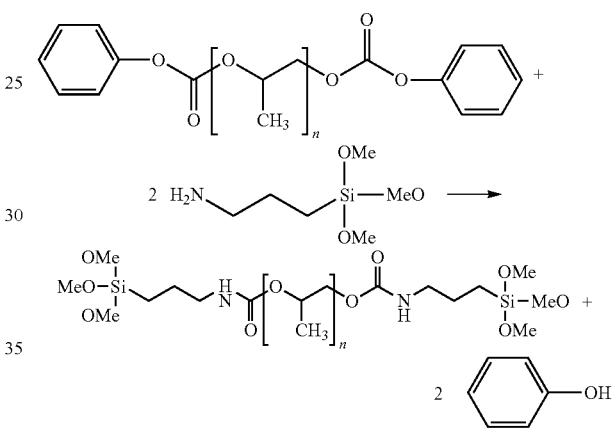

The polymer can be used for producing moisture-curing adhesives, sealants and coating materials based on silane-terminated polymers.

Example 2: Carbonate-Terminated Polyether with Aminosilane 50 g (0.012 mol) of the phenyl carbonate-terminated polymer, prepared analogously to Example 1, are left to react with 6.26 g (0.024 mol) of piperazinylmethylmethyldiethoxysilane (SiSiB® SILANES) for at least 12 hours at 25° C. The phenol formed remains in dissolved form in the colorless to pale yellowish, clear reaction mixture. Diethoxysilane-terminated polyether is obtained as product. The diethoxysilane groups are attached to the polyether via a urethane bond.

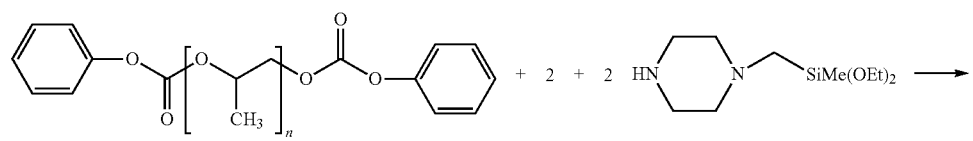

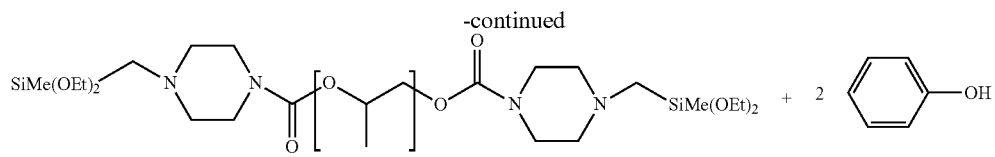

The polymer can be used for producing moisture-curing adhesives, sealants and coating materials based on silane-terminated polymers.

Example 3: Carbonate-Terminated Polyether with Aminosilane 50 g (0.012 mol) of the phenyl carbonate-terminated polymer, prepared analogously to Example 1, are left to react with 6.26 g (0.024 mol) of [3-(1-piperazinyl) propyl] trimethoxysilane at 25° C. for at least 12 hours. The phenol formed remains behind in dissolved form in the colorless to slightly yellowish, clear reaction mixture. Trimethoxysilane-terminated polyether is obtained as product. The trimethoxysilane groups are attached to the polyether via a urethane bond.

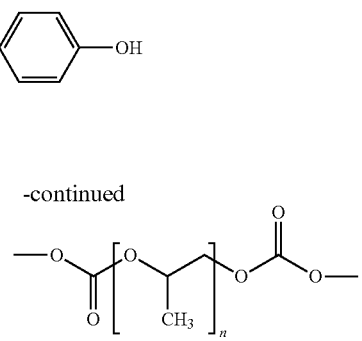

50 g (0.012 mol) of the carbonate-terminated polymer are reacted with 4.30 g (0.024 mol) of 3-aminopropyltrimethoxysilane (Evonik) and 0.1 g of 1,5,7-triazabicyclo[4.4.0]dec-5-ene (Sigma-Aldrich) at 60° C. for 24 h. The methanol formed is distilled off. Trimethoxysilane-terminated polyether is obtained as product. The trimethoxysilane groups are attached to the polyether via a urethane bond.

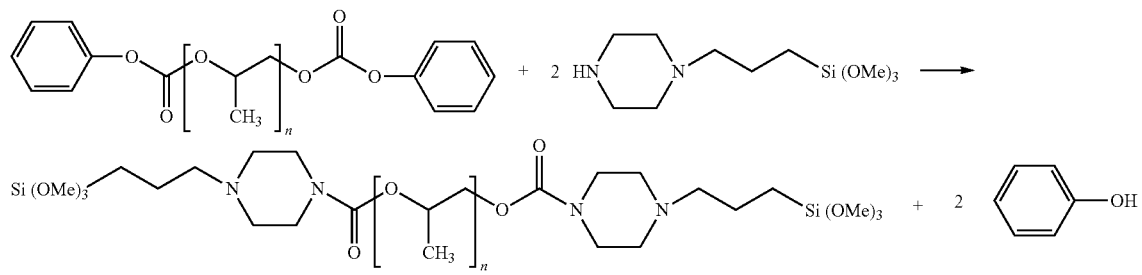

The polymer can be used for producing moisture-curing adhesives, sealants and coating materials based on silane-terminated polymers.

Example 4: Methyl Carbonate Terminated Polyether with Aminosilane 95.7 g (0.024 mol) of polyether diol (Desmophen 4028BD from Covestro) are predried at 80° C. for one hour under reduced pressure. It is then cooled to room temperature. 7.2 g (0.054 mol) of dimethyl dicarbonate (Merck) are added at room temperature. 0.1 g of lanthanum triflate are added to the reaction mixture as catalyst. The reaction mixture is left to react overnight under reduced pressure in order to remove the methanol and carbon dioxide formed from the reaction mixture. The product obtained is methyl carbonate-terminated polyether in high yield.

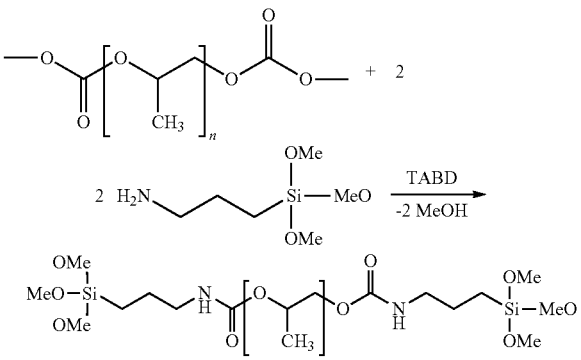

The polymer can be used for producing moisture-curing adhesives, sealants and coating materials based on silane-terminated polymers.

Example 6: Carbonate-Terminated Polyester with Aminosilane 100 g (0.016 mol) of polyester diol (polyol P-6010 from Kuraray having a viscosity of 105 Pas) are dissolved in 100 ml of toluene at room temperature (25° C.). Then 4.2 g (0.04 mol) of triethylamine are added. The solution is homogeneous after a brief time and is colorless and clear. 5.3 g (0.034 mol) of phenyl chloroformate, pre-dissolved in 8 ml

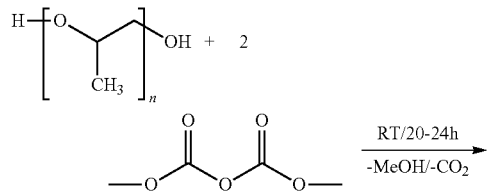

of toluene, are uniformly added dropwise to the reaction solution over a period of 45-75 minutes. The reaction mixture is further stirred for at least 8 hours. The reaction mixture is then cooled down to ca. 8° C. The resulting precipitate of triethylamine hydrochloride is filtered off and washed off with a little toluene. The solvent is then removed under reduced pressure. The product obtained in high yield is phenyl carbonate-terminated polyester having a viscosity of 101 Pas.

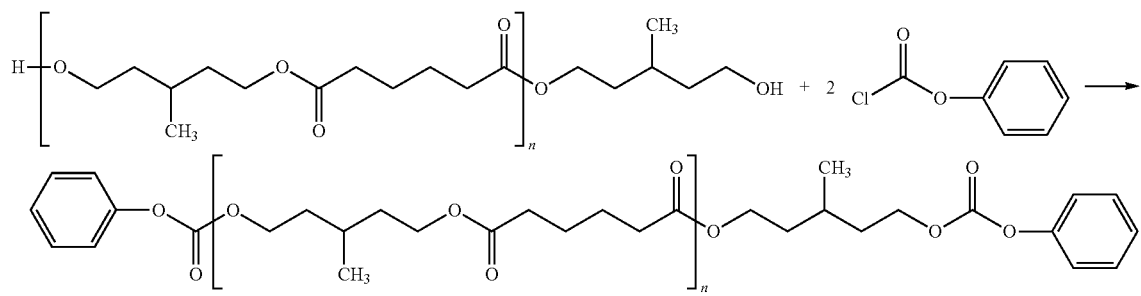

50 g (0.008 mol) of the phenyl carbonate-terminated polymer are left to react with 3.0 g (0.016 mol) of 3-aminopropyltrimethoxysilane (Evonik) at 25° C. for at least 12 h. The phenol formed remains behind in dissolved form in the colorless to slightly yellowish, clear reaction mixture. The product obtained is trimethoxysilane-terminated polyester having a viscosity of 107 Pas. The trimethoxysilane groups are attached to the polyester via a urethane bond.

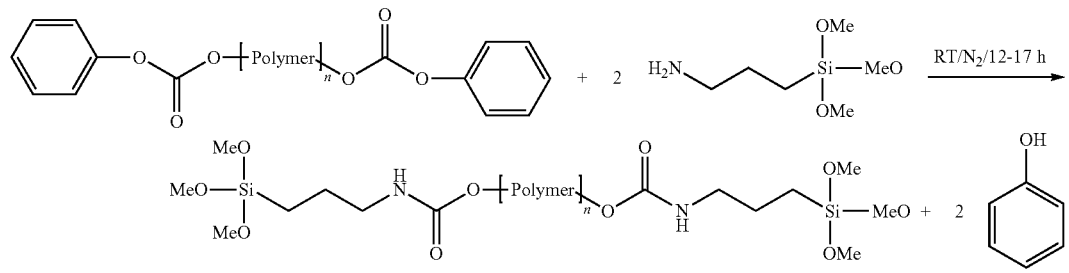

The polymer can be used for producing moisture-curing adhesives, sealants and coating materials based on silane-terminated polymers.

Comparative Example 100 g (0.016 mol) of polyester diol (polyol P-6010 from Kuraray having a viscosity of 105 Pas) are stirred with 5.35 g (0.033 mol) of carbonyldiimidazole (CDI) at 60° C. for 12 h under nitrogen. The product obtained is imidazole carbamate-terminated polyether having a viscosity of 124 Pas.

50 g (0.008 mol) of the imidazole carbamate-terminated polymer are reacted with 3.0 g (0.016 mol) of 3-aminopropyltrimethoxysilane (Evonik) at 60° C. for 24 h. Trimethoxysilane-terminated polyether having a viscosity of 190 Pas is obtained as product. The trimethoxysilane groups are attached to the polyether via a urethane bond.

Formulation Examples 7-8

The following formulations (data in percent by weight) were mixed in a speed mixer (DAC 1100 FVZ, Hauschild) and filled into 310 ml PE cartridges (Ritter). The finished formulations were stored in a standard climate (23° C./50% RH), and the viscosity after storage was measured with a rheometer (RS6000, Haake). Whereas formulation example 7 shows the increase in viscosity typical of silane-terminated polymers on storage, in formulation example 8 the viscosity decreases on storage. This indicates degradation of the polymer chains.

| | Formulation example 7 | Formulation example 8 |
|---|---|---|
| Trimethoxysilane-terminated polyester from Ex 6 | 34.9% | |
| Trimethoxysilane-terminated polyester from comparative example | | 34.9% |
| Vinyltrimethoxysilane | 1% | 1% |
| Omyalite 95T | 50% | 50% |
| Titanium dioxide | 2% | 2% |
| Thixatrol MAX | 2% | 2% |
| Diisononyl phthalate | 9% | 9% |
| 3-Aminopropyltrimethoxysilane | 1% | 1% |

-continued

| | Formulation example 7 | Formulation example 8 |
|---|---|---|
| 1,8-Diaza-bicyclo[5.4.0]undec-7-ene | 0.1% | 0.1% |
| Viscosity at 10 s$^{-1}$ [Pas] after storage of the cartridge in a standard climate for 1 day | 331 | 303 |
| Viscosity at 10 s$^{-1}$ [Pas] after storing the cartridge in a standard climate for 7 days | 399 | 224 |

Example 9 Carbamate-Terminated Polyether with Aminosilane 80 g (0.02 mol) of polyether diamine having an average molar mass of 4000 g/mol (available from Sigma-Aldrich) are dissolved in 100 ml of toluene at room temperature (25° C.). Then 5.1 g (0.05 mol) of triethylamine are added. The solution, which is homogeneous after a short time, is yellow and clear. 2.5 g (0.016 mol) of phenyl chloroformate, pre-dissolved in 8 ml of toluene, are uniformly added dropwise to the reaction solution over a period of 45-75 minutes. The reaction mixture is further stirred for at least 8 hours. The reaction mixture is then cooled down to ca. 8° C. The resulting precipitate of triethylamine hydrochloride is filtered off and washed off with a little toluene. The solvent is then removed under reduced pressure. The product obtained is phenyl carbamate-terminated polyether in high yield.

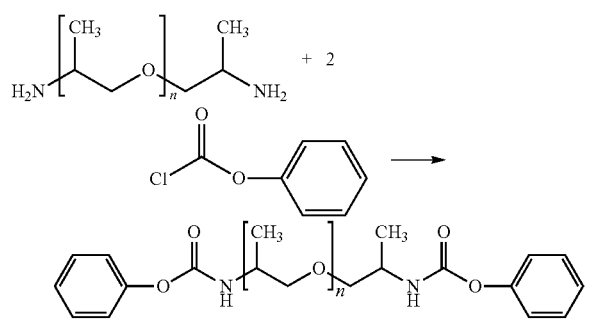

42 g (0.01 mol) of the phenyl carbonate-terminated polymer are reacted with 3.6 g (0.02 mol) of 3-aminopropyltrimethoxysilane (Evonik) at a bath temperature of 50° C. 0.03 g of 1,5,7-triazabicyclo[4.4.0]dec-5-ene (Sigma-Aldrich) are added to the reaction mixture as catalyst. The reaction is complete after 17 hours at the latest. The phenol formed remains in dissolved form in the yellow, clear reaction mixture. Trimethoxysilane-terminated polyether is obtained as product. The trimethoxysilane groups are attached to the polyether via a urea bond.

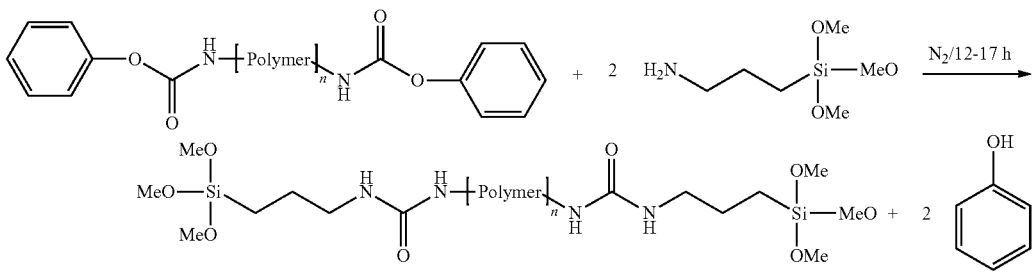

The polymer can be used for producing moisture-curing adhesives, sealants and coating materials based on silane-terminated polymers.

The invention claimed is:

1. A method for producing an alkoxysilane polymer via a carbamate-, thiocarbonate- or carbonate-terminated prepolymer (IIIa) or (IIIb), wherein the production of the carbamate-, thiocarbonate- or carbonate-terminated prepolymer comprises a reaction of a polymer backbone of formula (I), terminated with at least two amino, mercapto or hydroxyl groups, with a chloroformate of formula (IIa) or a pyrocarbonate of formula (IIb)

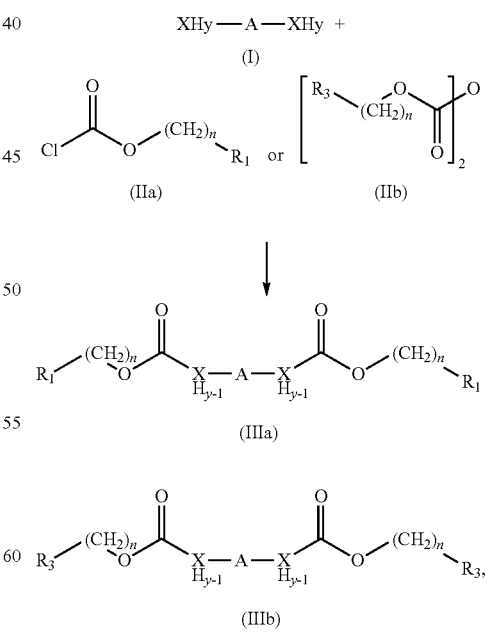

wherein
R$_1$ and R$_3$ are a linear or branched, saturated or unsaturated alkyl or alkenyl group having 1 to 10 carbon atoms or a mono- or polycyclic aliphatic or aromatic ring system having 5 to 18 carbon atoms in the ring system, which is optionally substituted by one or more radicals $R^2$, wherein $R^2$ is selected from the group consisting of a linear or branched, saturated or unsaturated alkyl or alkenyl group having 1 to 10 carbon atoms, a nitro group, a carboxylic ester group, a carboxylic acid group, a sulfone group and a halogen group X is oxygen, nitrogen, or sulphur y is 1 when X is oxygen or sulphur and 1 or 2 when X is nitrogen, n is 0 in the case of a linear or branched, saturated or unsaturated alkyl or alkenyl group and is 0, 1 or 2 in the case of a mono- or polycyclic aliphatic or aromatic ring system and A is a polymer backbone.

2. The method as claimed in claim 1, wherein the reaction is carried out with a chloroformate of formula (IIb).

3. The method as claimed in claim 1, wherein the reaction is carried out in the absence of a first catalyst (I).

4. The method as claimed in claim 1, wherein $R^1$ is a mono- or polycyclic aromatic ring system having 6 to 18 carbon atoms in the ring system, selected from the group consisting of phenyl, 1-naphthyl, 2-naphthyl, 1-anthryl, 2-anthryl, 9-anthryl, 1-phenanthryl and 9-phenanthryl and n is 0 or 1.

5. The method as claimed in claim 1, wherein $R^1$ is an alkyl group selected from the group consisting of methyl, ethyl, propyl, isopropyl, n-butyl, isobutyl, tert-butyl, n-pentyl, isopentyl, n-hexyl, n-heptyl, n-octyl, n-nonyl and n-decyl.

6. The method as claimed in claim 1, wherein the polymer backbone of formula (I) has exactly two amino, mercapto or hydroxyl groups.

7. The method as claimed in claim 1, wherein the polymer backbone of formula (I) has more than two amino, mercapto or hydroxyl groups.

8. The method as claimed in claim 7, wherein essentially each monomer unit of the polymer backbone has a side chain with an amino, mercapto or hydroxyl group.

9. The method as claimed in claim 1, wherein the polymer backbone A is selected from the group consisting of polyethers, polyalcohols, polyolefins, polyesters, polycarbonates, polyamines, polyamides, polyacrylates, polysulfides, polysiloxanes, polyacetals and copolymers thereof.

10. The method as claimed in claim 9, wherein the polymer backbone A is polypropylene glycol or a polyester.

11. The method as claimed in claim 1, wherein the prepolymer (III) is reacted in a further step with
(A) an aminoalkoxysilane or a mercaptoalkoxysilane, optionally in the presence of a second catalyst (II) or
(B) a diamine, a triamine, a dithiol or a trithiol to give a modified prepolymer and
is then reacted with an alkoxysilane compound having an epoxy group, wherein an alkoxysilane polymer is formed.

12. The method as claimed in claim 11, in which the prepolymer is reacted with an alcohol or an activated alcohol prior to the reaction steps according to variant (A) or variant (B).

13. The method as claimed in claim 11, in which in variant (A) the aminoalkoxysilane is selected from the group comprising 3-aminopropyltrimethoxysilane, 3-aminopropyltriethoxysilane, N-(n-butyl)-3-aminopropyltrimethoxysilane, N-(n-butyl)-3-aminopropylmethyldimethoxysilane, N-(n-butyl)-3-aminopropyltriethoxysilane, N-ethylaminoisobutyltrimethoxysilane, N-ethylaminoisobutylmethyldimethoxysilane, 3-piperazinopropyltrimethoxysilane, 3-piperazinopropylmethyldimethoxysilane, 3-piperazinopropyltriethoxysilane, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane and an equimolar reaction product of piperazine and
glycidoxypropyltrimethoxysilane and the mercaptoalkoxysilane is selected from the group comprising 3-mercaptopropyltrimethoxysilane, 3-mercaptopropyltriethoxysilane,
3-mercaptopropylmethyldimethoxysilane and 3-mercaptopropyltrimethoxysilane.

* * * * *